US010459757B1

(12) United States Patent
Srinivasan et al.

(10) Patent No.: US 10,459,757 B1
(45) Date of Patent: Oct. 29, 2019

(54) PRESCRIPTIVE CLOUD COMPUTING RESOURCE SIZING BASED ON MULTI-STREAM DATA SOURCES

(71) Applicant: Accenture Global Solutions Limited, Dublin (IE)

(72) Inventors: Madhan Kumar Srinivasan, Bengaluru (IN); Guruprasad Pv, Bengaluru (IN); Arun Purushothaman, Chennai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/411,064

(22) Filed: May 13, 2019

(51) Int. Cl.
*G06F 9/455* (2018.01)
*G06F 9/46* (2006.01)
*G06F 9/54* (2006.01)
*G06F 9/38* (2018.01)

(52) U.S. Cl.
CPC ........ *G06F 9/45558* (2013.01); *G06F 9/3802* (2013.01); *G06F 9/3851* (2013.01); *G06F 9/545* (2013.01); *G06F 2009/45583* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| 5,907,675 | A | 5/1999 | Aahlad |
| 8,336,049 | B2 | 12/2012 | Medovich |
| 8,612,599 | B2 | 12/2013 | Tung et al. |
| 8,862,914 | B2 | 10/2014 | Kansal et al. |
| 9,367,340 | B2 | 6/2016 | Wang |
| 10,129,106 | B2 | 11/2018 | Cropper et al. |
| 2010/0169253 | A1 | 7/2010 | Tan |
| 2010/0199285 | A1 | 8/2010 | Medovich |

(Continued)

FOREIGN PATENT DOCUMENTS

WO    WO 2013/158139 A1    10/2013

OTHER PUBLICATIONS

Microsoft Docs, Introduction to Azure Advisor, dated Apr. 29, 2019, pp. 1-25, published online by Microsoft Azure at URL https://docs.microsoft.com/en-us/azure/opbuildpdf/advisor/toc.pdf?branch=live.

(Continued)

*Primary Examiner* — Bradley A Teets
(74) *Attorney, Agent, or Firm* — Brinks Gilson & Lione

(57) ABSTRACT

A multi-layer compute sizing correction stack may generate prescriptive compute sizing correction tokens for controlling sizing adjustments for computing resources. The input layer of the compute sizing correction stack may generate cleansed utilization data based on historical utilization data received via network connection. The input layer may receive one or more resource configurations that may be applied to implement the sizing correction. A prescriptive engine layer may generate a compute sizing correction trajectory indicative of a sizing adjustment to a computing resource. The compute sizing correction trajectory may account of historic processor, network, and memory utilization. Based on the compute sizing correction trajectory and a selected resource configuration, the prescriptive engine layer may generate the compute sizing correction tokens that that may be used to control compute sizing adjustments prescriptively.

20 Claims, 4 Drawing Sheets

(56) References Cited

U.S. PATENT DOCUMENTS

| | | |
|---|---|---|
| 2010/0269109 A1 | 10/2010 | Cartales |
| 2011/0055386 A1 | 3/2011 | Tung et al. |
| 2011/0302578 A1 | 12/2011 | Isci et al. |
| 2012/0096165 A1 | 4/2012 | Madduri et al. |
| 2012/0239739 A1 | 9/2012 | Manglik et al. |
| 2013/0042123 A1 | 4/2013 | Smith et al. |
| 2013/0111476 A1 | 5/2013 | Medovich |
| 2013/0247043 A1 | 9/2013 | Bingham et al. |
| 2014/0068609 A1 | 3/2014 | Breitgand et al. |
| 2014/0089495 A1 | 3/2014 | Akolkar et al. |
| 2014/0136269 A1 | 5/2014 | Wasser |
| 2014/0137110 A1 | 5/2014 | Engle et al. |
| 2014/0351199 A1 | 11/2014 | Madani et al. |
| 2015/0026108 A1 | 1/2015 | Portegys et al. |
| 2015/0278061 A1 | 10/2015 | Siciliano et al. |
| 2015/0288573 A1 | 10/2015 | Baughman et al. |
| 2015/0309828 A1 | 10/2015 | Shaik et al. |
| 2015/0331703 A1 | 11/2015 | Kelly et al. |
| 2016/0094401 A1 | 3/2016 | Anwar et al. |
| 2016/0094410 A1 | 3/2016 | Anwar et al. |
| 2016/0232022 A1 | 8/2016 | Kania et al. |
| 2016/0378519 A1 | 12/2016 | Gaurav et al. |
| 2017/0046190 A1 | 2/2017 | Sivasubramanian et al. |
| 2017/0075709 A1 | 3/2017 | Feng et al. |
| 2017/0242731 A1 | 8/2017 | Xie et al. |
| 2017/0344400 A1 | 11/2017 | Birke et al. |
| 2018/0006953 A1 | 6/2018 | Power et al. |
| 2018/0349168 A1 | 12/2018 | Ahmed |
| 2019/0079848 A1 | 3/2019 | Srinivasan et al. |
| 2019/0163517 A1 | 5/2019 | Fontoura et al. |
| 2019/0179675 A1 | 6/2019 | Srinivasan et al. |
| 2019/0205150 A1 | 7/2019 | Srinivasan et al. |

OTHER PUBLICATIONS

"Amazon CloudWatch—Cloud & Network Monitoring Services", retrieved from the Internet on Jun. 29, 2017, pp. 1-5, published online by Amazon Web Services, Inc. at URL https://aws.amazon.com/cloudwatch/?nc1=h_ls.

"Cloudyn for Enterprise," retrieved from the Internet on Jun. 30, 2017, pp. 1-3, published online by Cloudyn at URL https://www.cloudyn.com/enterprise/.

Start and Stop Instances at Scheduled Intervals Using Lambda and CloudWatch, "How do I stop and start EC2 instances at regular intervals using AWS Lambda?," retrieved from the Internet on Jun. 29, 2017, pp. 1-5, published online by Amazon Web Services, Inc., at URL https://aws.amazon.com/es/premiumsupport/knowledge-center/start-stop-lambda-cloudwatch/.

Ata E. Husain Bohra et al., "VMeter: Power Modelling for Virtualized Clouds," 2010 IEEE International Symposium on Parallel & Distributed Processing, Workshops and Phd Forum, dated May 24, 2010, pp. 1-8, published online by IEEE at URL https://doi.org/10.1109/IPDPSW.2010.5470907.

Best Practices, "Trusted Advisor Best Practices (Checks)," retrieved from the Internet on Jun. 29, 2017, pp. 1-6, published online by Amazon Web Services, Inc., at URL https://aws.amazon.com/es/premiumsupport/trustedadvisor/best-practices/.

Zhen Xiao et al, "Dynamic Resource Allocation Using Virtual Machines for Cloud Computing Environment," IEEE Transactions on Parallel and Distributed Systems, dated Jun. 2013, pp. 1107-1117, vol. 24, No. 6, published by IEEE, New Jersey, US.

U.S. Appl. No. 16/285,539, filed Feb. 26, 2019, pp. 1-42, U.S. Patent and Trademark Office, Alexandria, VA.

U.S. Appl. No. 16/423,720, filed May 28, 2019, pp. 1-39, U.S. Patent and Trademark Office, Alexandria, VA.

U.S. Appl. No. 16/219,435, filed Dec. 13, 2018, pp. 1-35, U.S. Patent and Trademark Office, Alexandria, VA.

U.S. Appl. No. 16/154,174, filed Oct. 8, 2018, pp. 1-55, U.S. Patent and Trademark Office, Alexandria, VA.

U.S. Appl. No. 16/411,064, filed May 13, 2019, pp. 1-43, U.S. Patent and Trademark Office, Alexandria, VA.

Extended European Search Report, issued in European Application No. 17202112.3, dated Jun. 4, 2018, pp. 1-8, European Patent Office, Munich, Germany.

Australian Examination Report No. 1, issued in Australian Application No. 2017261531, dated May 7, 2018, pp. 1-8, IP Australia, Phillip, Australia.

Extended European Search Report, issued in European Application No. 18203941.2, dated Apr. 25, 2019, pp. 1-9, European Patent Office, Munich, Germany.

Jian Zhang et al., "Adaptive Predictor Integration for System Performance Prediction," dated Jun. 11, 2007, pp. 1-10, DOI: 10.1109/IPDPS.2007.370277, 2007 IEEE International Parallel and Distributed Processing Symposium, published online by IEEE at URL https://doi.org/10.1109/IPDPS.2007.370277.

Australian Examination Report No. 1, issued in Australian Application No. 2018250389, dated Apr. 10, 2019, pp. 1-6, IP Australia, Philip, Australia.

Non-Final Office Action, issued in U.S. Appl. No. 15/922,650, dated Jun. 20, 2019, pp. 1-13, U.S. Patent and Trademark Office, Alexandria, VA.

PRESCRIPTIVE CLOUD COMPUTING RESOURCE SIZING BASED ON MULTI-STREAM DATA SOURCES

TECHNICAL FIELD

This disclosure relates to cloud computing resource scheduling via a prescriptive analytics based compute sizing correction stack.

BACKGROUND

Rapid advances in communications and storage technologies, driven by immense customer demand, have resulted in widespread adoption of cloud systems for managing large data payloads, distributed computing, and record systems. As one example, modern enterprise systems presently maintain data records many petabytes in size in the cloud. Improvements in tools for cloud resource allocation and consumption prediction will further enhance the capabilities of cloud computing systems.

DETAILED DESCRIPTION

Figure 1:
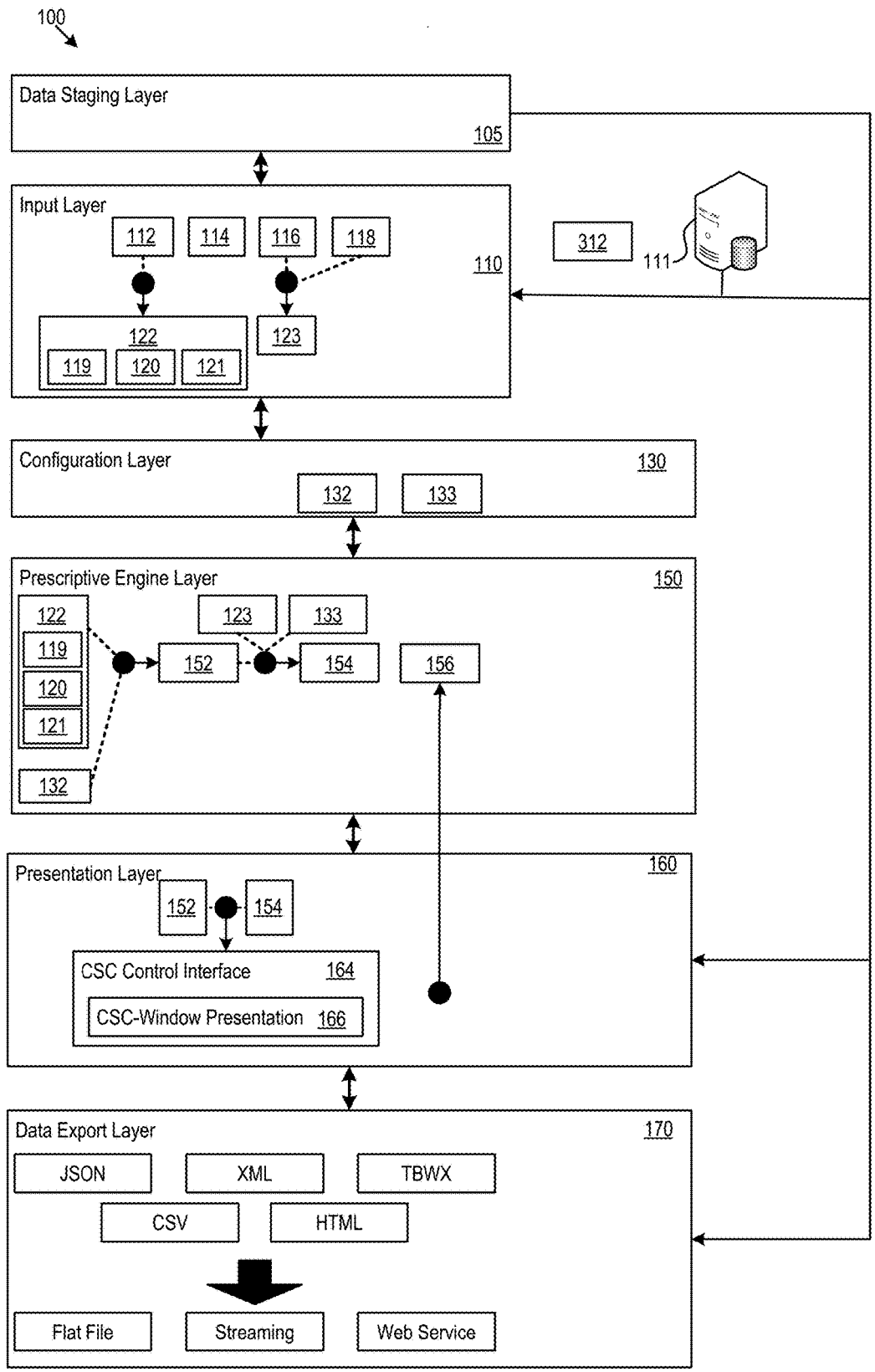
FIG. 1 shows an example multiple-layer compute sizing correction stack.

In cloud computing systems, computing resources such as virtual machines, memory, processor cores, network resources or other computing resources may be scheduled for planned utilization. Cloud providers may provide various resource configurations for provisioning computer resources. The resource configurations may define committed use allocations of computer resources for virtual machines at numerous price and performance points. Choosing the right-sized resource configuration for an enterprises specific workload is an important factor for application deployment and cost management. Moreover, right sizing computer resources ensures efficient and proper operation during various loading scenarios. For example, a provisioned virtual machine may be utilized sporadically or partially, such that a virtual machine corresponding to a smaller compute size could fill the demands on the provisioned virtual machine. Conversely, a provisioned virtual machine may be used continually or at capacity and may be unable to fulfill computing requests assigned to it. For example, the virtual machine, in some cases, may reject or be non-responsive to over-capacity requests. Accordingly, an over-sized or under-sized computing resource may lead to performance degradation or inefficient deployment of hardware resources.

One example of a technical advancement described by the systems and methods described herein may be that a compute sizing correction (CSC) stack may determine a sizing correction trajectory based on various utilization metrics derived from historical data, including, for example, network traffic history, CPU utilization history, memory utilization history, resource allocation history, activation/reservation/committed-use history data, expenditure report data for resource reservation/activation/committed-use, computing cycles, data throughput, seasonal usage cycles e.g., holiday schedules, daily usage cycles, weekly usage cycles, quarterly usage cycles or other data. Alternatively or in addition, the CSC stack may determine the sizing correction based on information including expenditure report data for resource reservation/activation, computing resource consumption metric data, activation request data, functional grouping data, topological or relationship data, tagging data, and/or other metadata. In some examples, the various data may be evaluated based on a sizing criteria. The sizing criteria may include tunable thresholds that may be adjusted to calibrate the sizing criteria for various implementations and performance tolerances.

Another example of a technical advancement described by the system and method described herein may be that the CSC stack may select right-sized computer resource configurations from a resource configuration repository. For example, the resource configurations may include tagging data descriptive of one or more computer resources that are offered by a cloud service provider. Some cloud service providers, such as MICROSOFT AZURE, may provide multiple resource configurations. In some examples, the tagging data provided by a cloud provider may lack relevant information to select right-sized committed-use configurations. The CSC stack may enrich the resource configurations with additional tagging data including, for example, performance metrics, cost metrics, and other metrics relevant to determining whether to perform an upsize or downsize of a computer resource. The CSC stack may select one or more of the resource configuration(s) based on, for example, comparisons between the tagging data of the resource configurations and tagging data of a computer resource identified for rightsizing. In general, tagging data may include information descriptive of a computer resource, or allocation of the computer resource. For example tagging data my include make information, model information, version information, performance specifications, cost information, etc. Alternatively or in addition, the tagging data may include data provided by an operator, provisioning or configuration management system, or an analyzed system detailing functional groupings (e.g., project-specific allocations, hardware (including virtualized hardware) marked for a specific purpose, availability zones, operating systems applications, installed software, or other groupings), quality of service requirements, minimum allocations, environmental data, license tags, or other data.

The CSC stack may provide prescriptive analytical sizing correction taking into account resource utilization patterns, computing resource types, computing resource availability, consumption metric data, workload and topological data, geographic data, available computer resource configuration, and/or other data. Thus, the disclosed CSC stack techniques and architectures improve the operation of the underlying hardware by increasing computing efficiency and provide an improvement over existing solutions. Additional and/or alternative technical advancements are made evident by the system and methods described herein.

FIG. 1 shows an example multiple layer CSC stack 100, which may execute on sizing circuitry making up the hardware underpinning of the CSC stack 100. In this example, the CSC stack 100 includes a data staging layer 105, an input layer 110, a configuration layer 130, a prescriptive engine layer 150, a presentation layer 160, and a data export layer 170. The CSC stack 100 may include a multiple-layer computing structure of hardware and/or software that may provide prescriptive analytical recommendations (e.g., static reservation scheduling for virtual machines or other computing resource activation scheduling) through data analysis.

In some implementations, as discussed below, CRSR Engine-a Cloud Right-Sizing Recommendation Engine developed by Accenture® Bangalore may be operated as the CSC stack 100.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example for the CSC stack 100, the data staging layer 105 may provide the input layer 110 with storage resources to store ingested historical utilization data within a database. Hence, the data staging layer 105 may provide a hardware resource, e.g., memory storage resources, to the input layer 110. Accordingly, the multiple-layer stack architecture of the CSC stack may improve the functioning of the underlying hardware.

Figure 2:
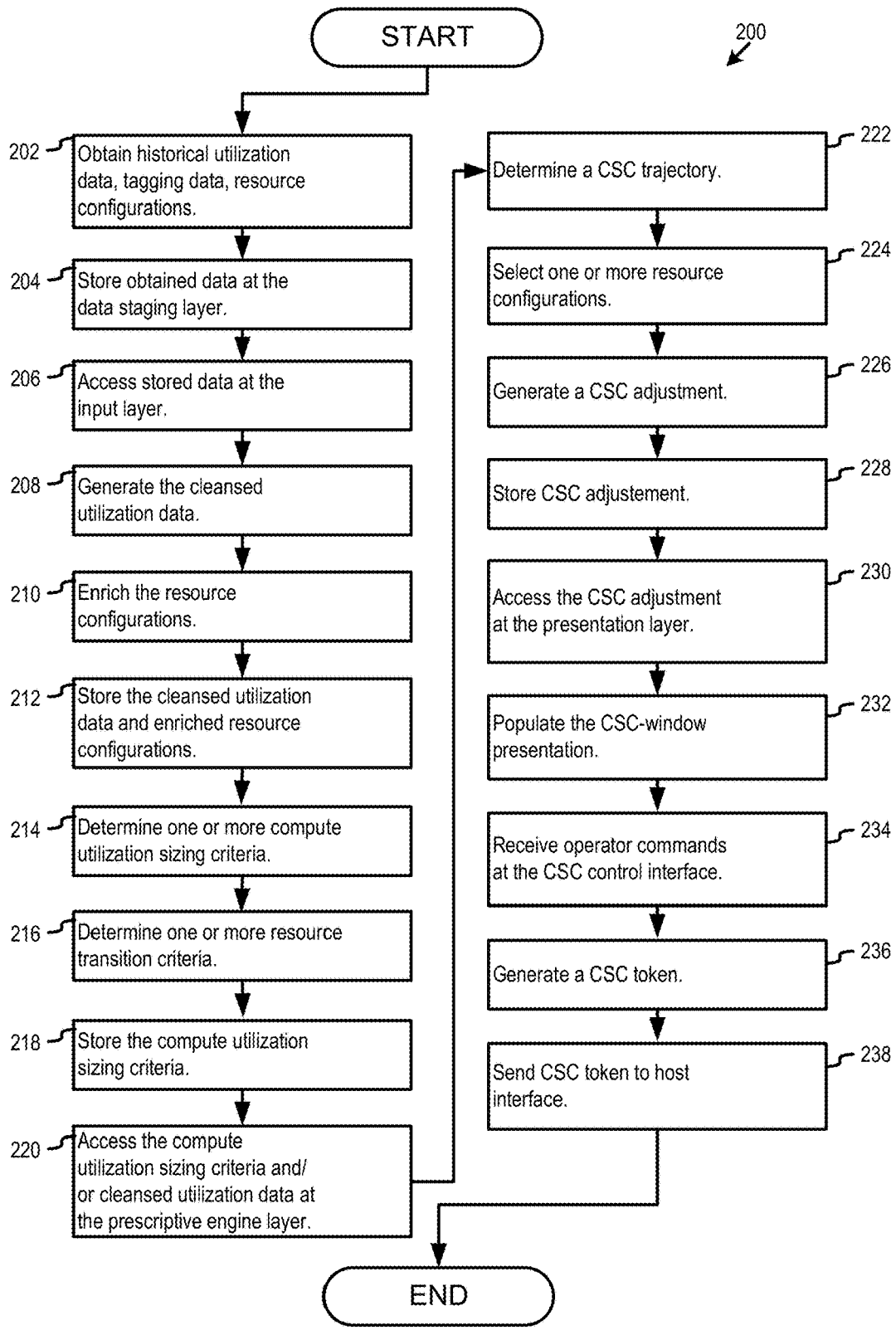
FIG. 2 shows example compute sizing correction stack logic.

In the following, reference is made to FIG. 1 and the corresponding example CSC stack logic (CSCL) 200 in FIG. 2. The logical features of CSCL 200 may be implemented in various orders and combinations. For example, in a first implementation, one or more features may be omitted or reordered with respect to a second implementation. At the input layer 110 of the CSC stack 100, the CSCL 200 may obtain historical utilization data 112, consumption metric data 114, tagging data 116, and/or resource configuration data 118 (202) and then store the obtained data at the data staging layer 105 (204). In some cases, the historical utilization data 112, consumption metric data 114, tagging data 116, and/or resource configuration data 118 may be received via communication interfaces (e.g., communication interfaces 312, discussed below). The historical utilization data 112, consumption metric data 114, tagging data 116, and/or resource configuration data 118 may be accessed at least in part, e.g., via the communication interfaces 312, from data sources 111, which may include, cloud compute utilization databases, cloud expenditure databases, master virtual machine cost databases, committed-use history databases, virtual machine family/template description data, a resource configuration repository, infrastructure/project tags or other data sources. The historical utilization data 112 may be provided by cloud compute utilization databases, cloud expenditure databases, committed-use history databases, or other utilization data sources. The consumption metric data 114 may be provided by cloud expenditure databases, master virtual machine cost databases, virtual machine family/template/platform as a service, description data, or other consumption metric data sources. The tagging data 116 may be provided by virtual machine family/template description data, infrastructure/project tags or other tagging data sources. The resource configuration data 118 may be stored in a resource configuration repository or some other configuration source. The resource configuration repository may store the resource configuration data 118 for one or more cloud service providers. In some examples, the resource configuration repository may be manually populated with the resource configuration data. Alternately or in addition, the resource configuration data 118 may be obtained from the cloud service provider. After the historical utilization data 112, resource configuration data 118, and tagging data 116 are obtained and stored, the input layer 110 may access the some or all of the stored data (206) using memory resources passed from the data staging layer 105 (e.g., memory access resources). The input layer 110 may process the historical utilization data 112 to generate a cleansed utilization data 122 for the computing resources (208). For example, the input layer may reformat historical utilization data obtained from multiple sources into a common format for analysis. The common format may be a selected format to which data in other formats are translated. In some cases, the cleansed utilization data 122 may include a time-correlated history and cycle analysis of past computing resource usage to facilitate determination of likely patterns of future usage, e.g., for individual computing resources, computing resources within a functional group, or other groups of computing resources.

The cleansed utilization data 122 may include, among other data, one or more utilization metrics 119,120,121. The utilization metrics 119,120,121 may include a measure of usage of a computer resource (or computer resources). For example, the utilization metrical may include a processor utilization metric 119. The processor utilization metric 119 may include a measure of work handled by a CPU (or CPUs). The processor utilization 119 metric may be expressed as, for example, a percentage of time spent on a particular task, operations per second, or any other suitable measurement of CPU processing time. In an example, the processor utilization metric 119 may include a percentage of processing time devoted to a virtual machine or task(s) of a virtual machine.

Alternatively or in addition, the utilization metrics 119, 120,121 may include a memory utilization metric 120. The memory utilization metric 120 may include a measure of memory usage. For example, the memory utilization metric 120 may be expressed as a percentage of memory allocated or dedicated for a thread, process, virtual machine, and/or some other task or tasks. Alternatively or in addition, the memory utilization metric 120 may be expressed as memory capacity (i.e. gigabytes). In other examples, the memory utilization metric 120 may be expressed in any suitable format to denote memory allocation/dedication.

Alternatively or in addition, the utilization metrics 119, 120,121 may include a network utilization metric 121. The network utilization metric 121 may include a measure of network traffic including, for example, throughput, latency, or some other suitable metric indicative of the speed and/or quantity of data transferred over a network. Alternatively or in addition, the network utilization metric 121 may include a measure of network resources allocated, dedicated, or accessed. For example, the network utilization metric 121 may include a measure of data flow to and/or from a particular virtual machine.

In some cases, the techniques and architectures used in conjunction with an activation timetable stack such as that described in U.S. patent application Ser. No. 15/811,339, filed Nov. 13, 2017, entitled Prescriptive Analytics Based Activation Timetable Stack for Cloud Computing Resource Scheduling, which is entirely included herein by reference, may be used to perform or assist in generation of the cleansed utilization data 122. Therein, the input layer of the activation timetable stack may parse the historical utilization data 112, the consumption metric data 114, and tagging data 116 to identify patterns at multiple timescales. The input layer of the activation timetable stack may then generate time-correlated consumption data. In an illustrative scenario of how the CSC stack 100 may utilize the activation timetable stack outputs, the parsing of the historical utilization data 112, consumption metric data 114, and tagging data 116, done by the input layer of the activation timetable stack may be implemented by the input layer 110 of the CSC stack to generate the cleansed utilization data 122 (207).

Additionally or alternatively, to process the stored data 112, 114, 116, the input layer 110 may analyze time components of the stored data 112, 114, 116 to determine time related patterns. For example, the input layer 110 may identify weekly, monthly, holiday, seasonal, or other time cycles present within the stored data 112, 114, 116. Time-independent data, such as, non-conditional functional group assignments, may be applied to all time periods. However, temporal or otherwise dynamic functional groupings may be correlated to corresponding timescales.

To generate the cleansed utilization data 122, the input layer 110 may determine one or more timescales (e.g., timescales including time-invariant contributions) present within the data. For example, the input layer 110 may apply various frequency analyses to the data to determine periodic, aperiodic, and/or time-invariant trends. Additionally or alternatively, the input layer 110 may apply rule-based analyses such as holiday schedules, operational hours, or annual enterprise cycles that may be expressly defined by rules rather than through inferential analysis.

The input layer 110 may enrich the resource configuration data 118 to generate enriched configuration data 122 (210). For example, the tagging data 116 received at the input layer 110 may include supplemental tagging data for the resource configuration data. For example, supplemental tagging data may include user defined or computer-automatic scoring data for the resource configurations 118. The supplemental tagging data may include metrics, such as a cost metric, a performance metric, or some other metric that scores the resource configurations 118 provided by a cloud provider. The input layer 110 may append supplemental tagging data, or a portion thereof, to the resource configuration data 118 to generate the enriched resource configuration data 123. The input layer 110 may rank, based on the tagging data and/or supplemental tagging data, one or more resource configurations. For example, the input layer 110 may rank resource configurations based on cost, expected processor performance, I/O performance, throughput, storage capacity, and/or any other type of tagging data or supplemental tagging data.

Once the cleansed utilization data 122 and/or the enriched resource configuration data 123 is generated, the input layer 110 may store the cleansed utilization data 122 and/or the enriched resource configuration data 123, via a database operation at the data staging layer 105 (212). For example, the cleansed utilization data 122 and/or the enriched resource configuration data 123 may be stored on storage dedicated to the CSCL 200. Additionally or alternatively, the cleansed utilization data 122 and/or the enriched resource configuration data 123 may be stored on a shared database or cloud storage. Accordingly, the data staging layer 105 may further access network resources (e.g., via communication interfaces 312, discussed below) to implement memory resource provision to the other layers. In an example implementation, the CSCL 200 may be defined within a Revolution-R environment. However, other design platforms may be used.

In some examples, the enriched resource configuration data 123 may be stored in a resource configuration repository included in the from data sources 111. For example, the input layer 110 may receive the resource configurations 118 from the resource configuration repository, a cloud provider, or some other data source. The input layer 110 may enrich the resource configuration by appending the supplemental to the resource configurations 118. The input layer 110 may store enriched resource configuration data 123 in the resource configuration repository.

At the configuration layer 130 of the CSC stack 100, the CSCL 200 may determine one or more compute utilization sizing criteria 132 (214). The compute utilization sizing criteria 132 may include threshold values, values for extrema (e.g., minimum, maximum), averages, or other criteria for determining when and how strongly to apply compute sizing correction. Alternatively or in addition, the compute utilization sizing criteria 132 may include logic determine a sizing correction based on network utilization, processor utilization, and/or memory utilization.

The compute utilization sizing criteria 132 may be supplied via operator input, e.g., via the CSC control interface 164, as discussed below. For example, an operator may select to apply compute sizing correction to computing resources with 95th percentile usage below a threshold value (or conversely determine to not compute sizing correction computing resources with 95th percentile usage above a minimum threshold value).

At the configuration layer 130 of the CSC stack, the CSCL 200 may determine one or more resource transition criteria 133 (216). The resource transition criteria 133 may include logic for selecting one or more resource configuration that are compatible with a computer resource. The resource transition criteria 133 may determine whether certain tags are associated with the resource configuration. In response to the tags being associated (or included in) in the resource configuration 133, the resource transition criteria 133 may permit an adjustment to the computer resource based on the resource configuration. In other examples, the resource transition criteria 133 may include identifiers of one or more resource configurations that are permitted for the computing resource.

The resource transition criteria may be supplied via the CSC control interface 164, as discussed below. Alternately or in addition, an operator may input one or more tags, identifiers of resource configurations, and/or other information to establish the resource transition criteria 133. In some examples, the resource transition criteria may identify tags of the computer resource that is being analyzed for revising. The tags of the transition criteria may identify tags of the computer resource that are to remain the same after re-provisioning of the compute resource. Alternatively or in addition, the tags of the transition criteria ma identify tags of the computer resource that may vary after re-provisioning the computer resource.

The CSCL 200 may store the compute utilization sizing criteria 132 and/or the resource transition criteria 133 via operation at the data staging layer 105 (218).

The prescriptive engine layer 150 may access the cleansed utilization data 122, the compute utilization sizing criteria 132, and/or the resource transition criteria 133 using a memory resource provided by the data staging layer 105 (220). For example, the data staging layer 105 may provide a memory read resource (such as a SQL database read resource) to the prescriptive engine layer 150 to allow access to the cleansed utilization data 122.

After accessing the cleansed utilization data 122 and/or the compute utilization sizing criteria 132, the CSCL 200, at the prescriptive engine layer 150, may determine a CSC trajectory 152 for a computing resource (222). A CSC trajectory 152 may include a target, or sizing trajectory, for a computing resource. For example, the CSC trajectory 152 may indicate that a computing resource should be upsized and/or downsized. Alternatively or in addition, the CSC trajectory 152 may indicate the amount or quantity by which the computing resource should be upsized and/or downsized. The determination may include predicting future utilization based on the time patterns extracted in the cleansed utilization data 122 generated at the input layer (or received, e.g., from an activation timetable stack, at the input layer).

In an illustrative example, the prescriptive engine layer 150 may implement the example logic in Table 1 to determine the CSC trajectory 152 for a computing resource.

TABLE 1

Example Routine for Determination of CSC Trajectory

| | Description |
|---|---|
| Example Routine | Right-Size* == [If $\alpha(t) <= \pi$ OR [$(\alpha(t) > \pi)$ & $(\epsilon(t) < \mu)$]] AND [if $\gamma(t) <= \sigma$ OR [$(\gamma(t) > \sigma)$ & $(\omega(t) < \varphi)$]] AND [$\beta >= k$]. |
| $\alpha(t)$ | Max utilization value for a time period "t". |
| $\pi$ | Max utilization threshold value. |
| $\epsilon(t)$ | $n^{th}$ percentile CPU utilization value for the given time-period "t" |
| $\mu$ | $n^{th}$ percentile threshold CPU utilization value. |
| $\gamma(t)$ | peak memory utilization value for the given time-period "t" |
| $\sigma$ | peak memory utilization threshold value |
| $\omega(t)$ | $n^{th}$ percentile memory utilization value for the given time-period "t" |
| $\varphi$ | $n^{th}$ percentile threshold Memory utilization value |
| $\beta$ | Network Traffic coefficient such that $\beta = \Omega(t)/\delta(t)$, where $\Omega(t)$ = peak network traffic for the given time-period "t" and $\delta(t)$ = $n^{th}$ percentile network traffic for the given time-period. |
| $k$ | Constant that can be tuned for a given application or environment such that $k >= 1$, (For high traffic applications, $k$ may be tuned closer to 1) |

In some examples, the logic in Table 1, or a portion there of, may be included in the compute utilization sizing criteria. The logic described in Table 1 is an example, but additional or alternative logic based on network utilization, processor utilization, and/or memory utilization is possible. In general, the CSCL 200 may determine memory utilization measurements, network utilization measurements and/or processor utilization measurements over a time period. The processor utilization measurements may include a peak processor utilization measurement and a percentile based utilization measurement over the time period. The memory utilization measurements may include a peak memory utilization measurement and a percentile based memory utilization measurement over the time period. The network utilization measurements may include a peak network traffic measurement and a percentile based network traffic measurement over the time period. In some examples, the network utilization measurements may further include a ratio of the peak network traffic measurement, and the percentile based network traffic measurement. The computer sizing criteria may include logic to compare the memory utilization measurements, network utilization measurements and/or processor utilization measurements with thresholds to determine a sizing correction. Table 1 describes various examples of the thresholds.

In an example, the CSCL 200 may generate the CSC trajectory in response to satisfaction of a first condition, satisfaction of a second condition, and/or satisfaction of a third condition. The first condition may be based on at least one of the processor utilization measurements (e.g. $\alpha(t) <= \pi$ OR [$(\alpha(t) > \pi)$ & $(\epsilon(t) < \mu)$] described in Table 1). The second condition is based on at least one of the memory utilization measurements (e.g. $\gamma(t) <= \sigma$ OR [$(\gamma(t) > \sigma)$ & $(\omega(t) < \varphi)$] described in Table 1). The third condition may be based on at least one of the network utilization measurements (e.g. $\beta >= k$ described in Table 1).

As described in the example in Table 1, satisfaction of the first condition may include the peak processor utilization measurement being greater than a threshold processor utilization value and the percentile-based processor utilization measurement being less than a percentile based processor threshold value. Satisfaction of the second condition may include the peak memory utilization measurement being greater than a threshold memory utilization value and the percentile-based memory utilization measurement being less than a percentile-based memory threshold value. Satisfaction of the third condition may include a network traffic ratio being greater than a network traffic utilization threshold. The network traffic ratio may include a ratio of the peak network traffic measurement and the percentile based traffic measurement.

In some implementations, the CSCL 200, at the prescriptive engine layer 150, may select one or more resource configurations (224). For example, the CSCL 200 may identify one or more resource configurations for a particular computing resource based on the resource transition criteria 133 and the enriched resource transaction configuration data 123. The resource transition criteria 133 may identify one or more resource configurations and/or identify tags compatible with a computing resource. The resource configuration identified by the resource transition criteria 133 may provide sufficient network, memory and/or network capabilities for a particular computing resource. The resource configuration selected by the CSCL 200 may specify a configuration of a computing resource, such as a virtual machine, after a transition.

In some examples, the input layer 110 may rank the resource configurations 118 based supplemental tagging data, as previously discussed. The transition criteria 133 may include an instruction to select one or more of the resource configurations 118 that have a highest rank. Alternatively or in addition, the transition criteria 133 may include multiple instructions to both select the resource configuration based on rank, and the presence of specific other tags associated with the resource configurations 118.

As described herein, a transition may refer to an upsize or a downsize of the physical and or virtual computing resource, or other computing resources that support the computing resource. For example, a computing resource, such as a virtual machine, my access (or include) a processor, networking hardware, memory hardware, an operating system, and other computing resources. When a virtual machine is transitioned, different computing resources (or different quantities of computing resources) are allocated and/or dedicated to the virtual machine.

In some examples, the CSCL 200 may access resource transition criteria 133 to ensure one or more computing resource, or characteristic a computing resource, is maintained after a transition. For example, the transition criteria may include one or more tags of the computer resource. The transition criteria may determine whether the identified tags of the computer resource are present in the resource configuration. In response to the tags being present in the resource configuration, the transition criteria may permit an adjustment to the computer resource based on the resource configuration.

The CSC trajectories 152 and/or CSC adjustments 154 may include sizing adjustments that transition computing resources across services, vendors, hardware platforms, or other characteristics. The CSCL 200 may apply the transition criteria to ensure the preservation of selected characteristics, e.g., operating system, region, security, networking throughput, or other characteristics, of the computing resources across such transactions. By way of example, the CSC trajectory may indicate a downsize or an upsize for particular virtual machine. Transition criteria may specify that certain characteristics, such as operating system, should remain the same as before that transition, while the processor type, memory capacity, and/or network throughput may be reduced (in the case of downsize) or increased (in the case of upsize). Alternatively or in addition, when porting across vendors to implement a sizing adjustment, the CSCL 200 may ensure that the operating system used by the replacement computing resource is the same as that before the transition. The CSCL 200 may also disallow certain transitions. For example, some implementations may disallow sizing transitions involving vendor changes.

The CSCL 200 may generate a CSC adjustment (226). A CSC adjustment may indicate intermediate compute sizing correction steps to progress towards the target sizing. In some examples, the compute sizing correction steps in some cases may correspond to an allowed adjustment within a cycle (e.g., billing period, interval, or other time period). Detailing an allowed adjustment may prevent the CSCL 200 from adjusting a computing resource at a rate that may produce unexpected results. For example, a CSC stack may constrain sizing adjustments to one sizing increment per cycle. However, other adjustment constraints may be used. A CSC trajectory 152 may be implemented by way of one or more CSC adjustments 154.

In some implementations, to determine the target sizing, the CSCL 200 may determine the sizing for the computing resource that would cause it to meet the compute utilization sizing criteria 132 based on the cleansed utilization data available for the computing resource.

In some cases, the CSCL 200 may further account for static reservation in compute sizing correction determinations. For example, the CSCL 200 may avoid applying sizing corrections to statically reserved computing resources (or computing resources for which static reservation is prescribed or planned). Accordingly, the CSCL 200 may increase sizing corrections (or the magnitude of such corrections). e.g., relative to initial sizing adjustment determinations, on dynamically reserved computing resources to avoid applying compute sizing correction to statically reserved computing resources. Accordingly, the CSCL 200 may reduce or eliminate a determined sizing reduction for a statically reserved computing resource or increase a sizing reduction for a dynamically reserved computing resource when other computing resources in the same functional group are statically reserved. Accordingly, the CSCL 200 may shift computing load to statically reserved computing resources from dynamically reserved computing resources.

In some implementations, the CSCL 200 may identify statically and dynamically reserved computing resources by accessing a reservation matrix, such as that generated by a committed compute reservation stack such as that described in U.S. patent application Ser. No. 15/922,659, filed Mar. 15, 2018, entitled Prescriptive Analytics Based Committed Compute Reservation Stack for Cloud Computing Resource Scheduling, which is incorporated by reference in its entirety. The reservation matrix may detail a distribution of statically and dynamically computing resources. In some implementations, the CSCL 200 may exhaust sizing adjustments for dynamically provisioned computing resources before applying sizing adjustment to statically reserved resources. In some implementations, the CSCL 200 may engage in an iterative sizing determination scheme with a committed compute reservation stack. The committed compute reservation stack may designate an initial distribution of static and dynamic computing resources. Then, the CSCL 200 may make sizing adjustments. The committed compute reservation stack may again adjust the distribution and the CSCL 200 may make further sizing adjustments. The iterative adjustment process may continue eventually reaching a steady state distribution and sizing determination.

In some implementations, CSCL 200, at the prescriptive engine layer 150, may alter the CSC trajectories 152 and/or CSC adjustments 154 based on learned preferences from operator command feedback history. For example, the prescriptive engine layer 150 may account for consumption savings patterns within operator comments. For example, some operators may aggressively pursue sizing reductions. Accordingly, the CSCL 200 may preemptively increase prescribed sizing reductions and/or preemptively decrease prescribed sizing increases. Conversely, an operator may demonstrate a reluctant to pursue sizing reductions and the prescriptive engine layer may adjust its prescriptions in the opposite direction. In some cases, operators may demonstrate functional group specific preferences. For example, operators may resist sizing adjustments to specific functional groups, while freely accepting prescriptions for sizing in other functional groups. Accordingly, the prescriptive engine layer 150 may apply machine learning to identify such patterns within operator commands and preemptively adjust the prescriptions produced to more closely match operator preferences.

Referring again to FIGS. 1 and 2, the CSCL 200 may store the CSC trajectories(s) 152, selected resource criteria, and/or CSC adjustment(s) and/or the selected resource configuration(s) (228).

The presentation layer 160 may then access the CSC adjustment for the computing resources (230). In some examples, the presentation layer 160 may merge the CSC trajectories and/or CSC adjustments with consumption metric data 114 to generate consumption saving data corresponding to the CSC trajectories and/or CSC adjustments. The presentation layer 160 may sort the computing resources according to consumption savings, functional groups, sizing adjustment magnitude, or other variables. The presentation layer 160 may generate the CSC control interface 164 and populate the CSC-window presentation 166 with the CSC trajectories and CSC adjustments and accompanying data and options (232).

The CSC control interface may receive operator commands, e.g., accepting and/or rejecting prescribed sizing adjustments (234). The CSCL 200 may incorporate the operator commands, and, at the prescriptive engine layer 150, generate a CSC token 156 (236). The CSC token 156 may include commands, scripts, or other code to cause host interfaces for controlling the respective computing resources to implement the sizing adjustments. For example, services such as Amazon® Web Services (AWS), Google® Compute Engine, Microsoft® Azure, or other cloud computing services, may maintain host interfaces (e.g., web interfaces, application programming interfaces, or other interfaces) by which clients may define operation of the computing resources. The CSCL 200 may also use a scheduling proxy system that uses the CSC trajectory data, CSC adjustment data, and operator command data to maintain schedules, calling the service provider's application programming interfaces, e.g., by sending a CSC token, for each sizing adjustment control action defined by the schedules. The CSCL 200 may use the communication interfaces 312 to send the CSC tokens to the host interfaces (238).

In an illustrative example scenario, the CSCL 200 may implement the example routine in Table 2 to generate a CSC token starting from data received at the input layer 110.

TABLE 2

Example Routine for Determination of CSC Token

| | Description |
|---|---|
| Example Routine | Input: Utilization database (Db), Billing Db, Cost Db, Committed Compute (CC) Purchase Db<br>Output: Sizing Adjustment<br>Step 1: Load the input files<br>Step 2: Cleanse the data<br>Step 2a: Select the required variables for analysis<br>Step 2b: Rename the variables<br>Step 2c: Format the variables (date, numeric and string)<br>Step 3: Selecting the peak utilization<br>Step 3a: for each resource id (1,n) sort utilization value by date and value<br>Step 3b: for each resource id (1,n) select peak value for each hour<br>Step 4: Filtering billing data for EC2 instances<br>Step 4a: Select for "Box-Usage" under "Usage Type"<br>Step 5: Merge Utilization, Billing, Cost Files and CC purchase history<br>Step 5a: Merge Utilization and Billing files by resource id<br>Step 5b: Merge the output of step5a with the Cost file (to extract the information of down-sized recommendation VM cost)<br>Step 5c: Merge CC purchase history to extract the number of CC coupons per VM type<br>Step 6: Calculating the 95$^{th}$ percentile utilization value<br>Step 6a: Calculate the 95$^{th}$ percentile value for each resource id (1,n)<br>Step 6b: Calculate the network traffic co-efficient<br>Step 7: Configure CPU, Memory, and Network Metrics<br>Step 8: Recommendation Flag generation<br>Step 7a: Right-Size = = [If $\alpha(t) <= \pi$ OR [($\alpha(t) > \pi$) & ($\varepsilon(t) < \mu$)]<br>AND [If $\gamma(t) <= \sigma$ OR [($\gamma(t) > \sigma$) & ($\omega(t) < \varphi$)] AND [$\beta >= k$]<br>where,<br>$\alpha(t)$ = Max utilization value for a time period "t".<br>$\pi$ = Max utilization threshold value.<br>$\varepsilon(t)$ = n$^{th}$ percentile CPU utilization value for the time-period "t"<br>$\mu$ = n$^{th}$ percentile threshold CPU utilization value.<br>$\gamma(t)$ = peak memory utilization value for the time-period "t"<br>$\sigma$ = peak memory utilization threshold value<br>$\omega(t)$ = n$^{th}$ percentile memory utilization value for the time-period "t"<br>$\varphi$ = n$^{th}$ percentile threshold Memory utilization value<br>$\beta$ = Network Traffic coefficient such that $\beta = \Omega(t)/\delta(t)$, where<br>$\Omega(t)$ = peak network traffic for the given time-period "t", and<br>$\delta(t)$ = n$^{th}$ percentile network traffic for the given time-period.<br>$k$ = Constant that can be tuned for a given application or environment such that $k >= 1$, (For high traffic applications $k$ may be tuned closer to 1)<br>Step 9: Calculate the "potential savings" (if the Right-Size (RS) recommendations are accepted)<br>Step 8a: Potential Savings = On Demand Cost — Down-size machine Cost<br>Step 10: Remove the duplicate records and generate the recommendations for each resource id<br>Step 11 : RS CC computation<br>Step 11a: Sort the resource id's by VM type, RS recommendation ≠ Right-size and potential savings by ascending order<br>Step 11b: Exhaust the existing Reserved instances in the order as above<br>Step 11c: Remaining RS recommendations represent the RS potential savings<br>Step 12: Binning the resource id's based on "potential savings"<br>Step 11a: Bin = 'High' if savings <= 65%, 'Medium' if 65% <= savings <= 85%, 'Low' if 85% <= savings<br>Step 13: Generate the final output |

In some cases, the CSCL 200 may initiate deployment via the data export layer 170. The data export layer 170 may format the reservation matrix in one or more formats for transfer. For example the data export layer 170 may support format translation to java script object notation (JSON), eXtensible markup language (XML), comma separated value (CSV), Tableau Workbook (TBWX), hyper-text markup language (HTML) or other formats. The data export layer 170 may also support transfer of the reservation matrix in one or more states, such as flat file transfers, streaming transfers, web service access, internet protocol transfers, or other transfers.

Additionally or alternatively, the CSCL 200 may initiate deployment via the prescriptive engine layer 150 through direct transfer, direct network access, or other non-export transfer.

Figure 3:
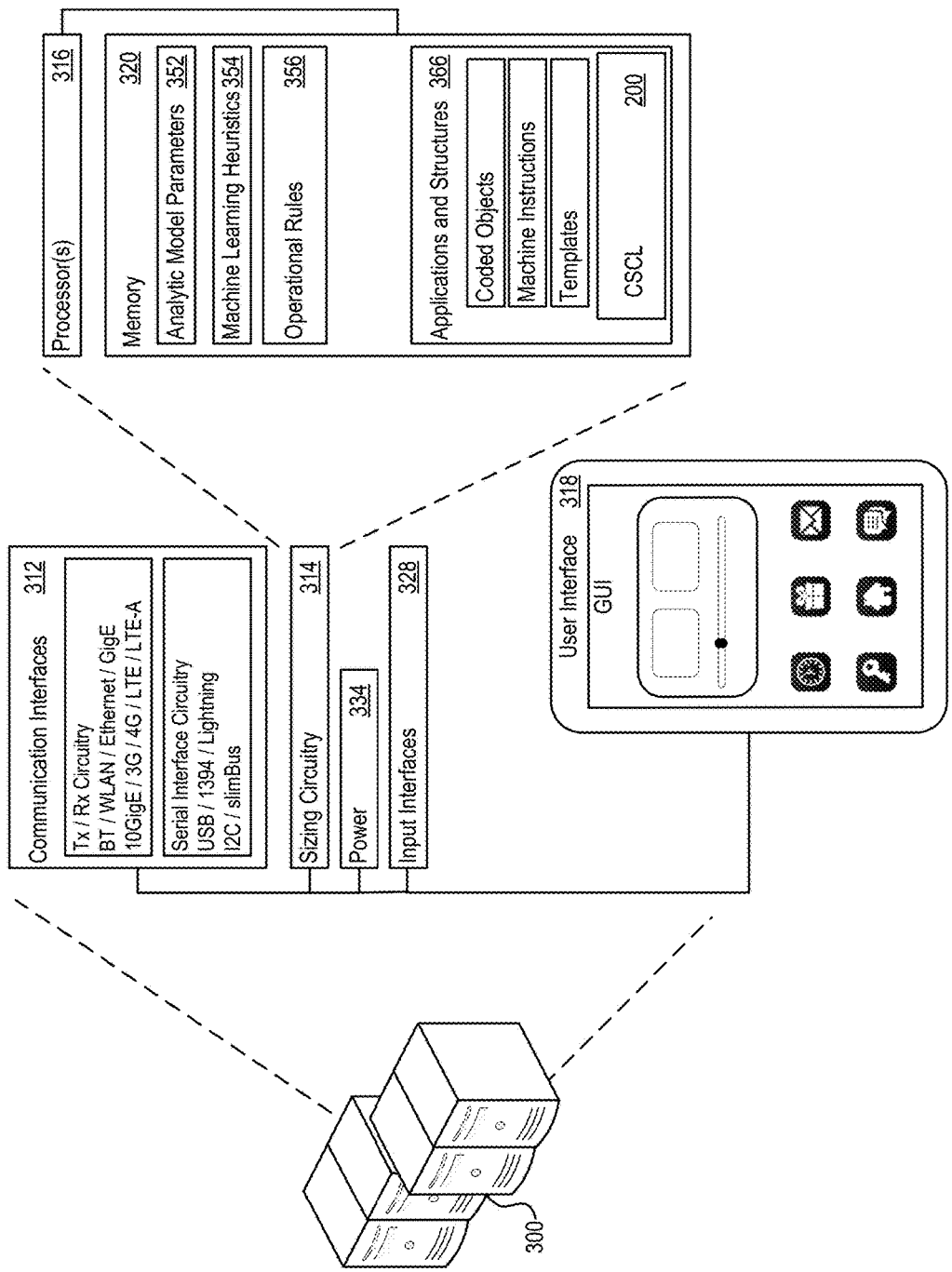
FIG. 3 shows an example specific execution environment for the compute sizing correction stack of FIG. 1.

FIG. 3 shows an example specific execution environment 300 for the CSC stack 100 described above. The execution environment 300 may include sizing circuitry 314 to support execution of the multiple layers of CSC stack 100 described above. The system logic may include processors 316, memory 320, and/or other circuitry.

The memory 320 may include analytic model parameters 352, machine learning heuristics 354, and operational rules 356. The memory 320 may further include applications and structures 366, for example, coded objects, machine instructions, templates, or other structures to support cleansed utilization data generation or other tasks described above. The applications and structures may implement the CSCL 200.

The execution environment 300 may also include communication interfaces 312, which may support wireless, e.g. Bluetooth, Wi-Fi, WLAN, cellular (4G, LTE/A), and/or wired, Ethernet, Gigabit Ethernet, optical networking protocols. The communication interfaces 312 may also include serial interfaces, such as universal serial bus (USB), serial ATA, IEEE 1394, lighting port, I$^2$C, slimBus, or other serial interfaces. The communication interfaces 312 may be used to support and/or implement remote operation of the CSC control interface 164. The execution environment 300 may include power functions 334 and various input interfaces 328. The execution environment may also include a user interface 318 that may include human-to-machine interface devices and/or graphical user interfaces (GUI). The user interface 318 may be used to support and/or implement local operation of the CSC control interface 164. In various implementations, the sizing circuitry 314 may be distributed over one or more physical servers, be implemented as one or more virtual machines, be implemented in container environments such as Cloud Foundry or Docker, and/or be implemented in Serverless (functions as-a-Service) environments.

In some cases, the execution environment 300 may be a specially-defined computational system deployed in a cloud platform. In some cases, the parameters defining the execution environment may be specified in a manifest for cloud deployment. The manifest may be used by an operator to requisition cloud based hardware resources, and then deploy the software components, for example, the CSC stack 100, of the execution environment onto the hardware resources. In some cases, a manifest may be stored as a preference file such as a YAML (yet another mark-up language), JSON, or other preference file type.

Figure 4:
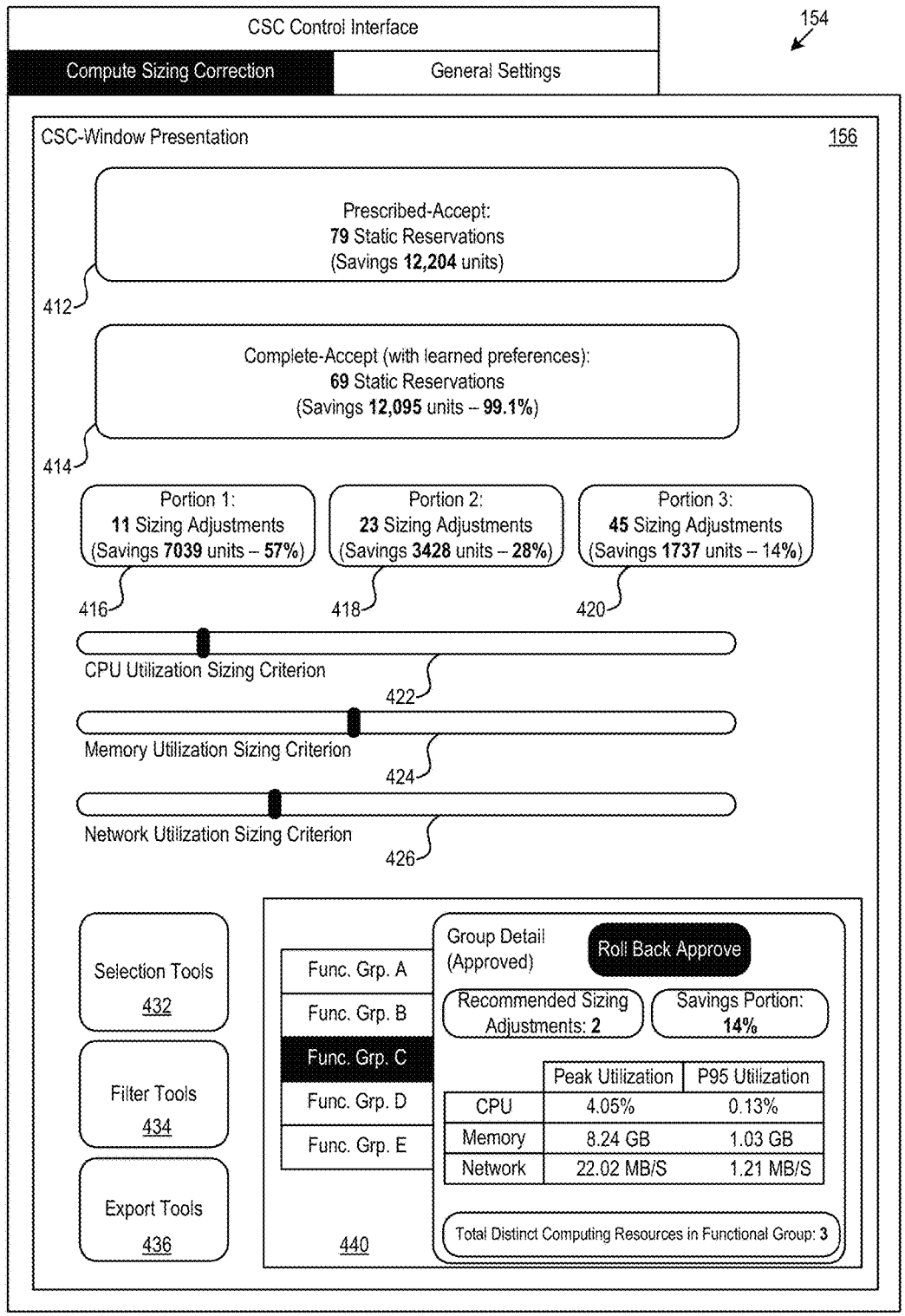
FIG. 4 shows an example compute sizing correction control interface.

Referring now to FIG. 4, an example CSC control interface 164 is shown. The CSC control interface 164 includes an example CSC-window presentation 166 as discussed above. The CSC-window presentation 166 may include multiple selectable options 412, 414, 416, 418, 420, 422, 424, 426 and data regarding the CSC trajectories and CSC adjustments before and after alteration to accommodate the learned preferences of the operator. In this example scenario, the selectable options may include a prescribed-accept option 412 to implement some or all of the prescribed sizing adjustments as a group without alteration based on learned preferences, a complete-accept option 414 to implement the sizing adjustments with alterations based on learned preferences, options 416, 418, 420 to implement augments to selected subsets of the computing resources, criteria controls 422-426 to adjust preferences (e.g., thresholds, extrema, or other utilization sizing criteria) and re-run the routine at the prescriptive engine layer 150, or other selectable options to control the eventual CSC token output.

The criteria controls 422-426 may include controls for receiving parameters, thresholds, and/or logic for determining the CSC trajectory, such as the example logic illustrated in Table 1. For example, the criteria controls 422-426 may include a processor sizing utilization criterion control 422. The processor utilization criterion control 422 may receive input information accessed to generate processor utilization sizing criterion. For example, input to the processor utilization criterion control 422 may be accessed to generate $\alpha(t) <= \pi$ OR $[(\alpha(t) > \pi)$ & $(\epsilon(t) < \mu)]$ (see Table 1), where $\pi$ and/or $\mu$ are derived from input provided to the processor sizing utilization criteria control 422.

Alternatively or in addition, the criteria controls 422-426 may include a memory sizing utilization criterion control 424. The memory utilization criterion control 424 may receive input information accessed to generate memory utilization sizing criterion. For example, input to the memory utilization criterion control 424 may be accessed to generate $\gamma(t) <= \sigma$ OR $[(\gamma(t) > \sigma)$ (see Table 1), where $\sigma$ and/or $\varphi$ are derived from input provided to the compute sizing utilization criteria control 424.

Alternatively or in addition, the criteria options 422-426 may include a network sizing utilization criterion control 426. The network utilization criterion control 426 may receive input information accessed to generate network utilization sizing criterion. For example, input to the network utilization criterion control 426 may be accessed to generate $\beta >= k$ (see Table 1), where $k$ is derived from input provided to the network sizing utilization criteria control 426.

Additionally or alternatively, the CSC-window presentation 166 may include selection and filter tools 432, 434 to support granular manipulation of the sizing adjustments, e.g., by computing resource, by functional group, resource region, operating system, or other granular manipulation. The CSC-window presentation 166 may also include export tools 436 for management of data export layer 170 operations.

In some implementations, the CSC-window presentation 166 may include a functional group detail panel 440 for management of group-level selectable options such as group level approvals of static reservations. Additionally or alternatively, the functional group detail panel 440 may display group-level information regarding static reservations. Functional group detail panel 440 may also provide an option to roll back previously approved static reservations.

In some examples, the functional group detail panel 440 may include performance related information for one or more computer resource within functional group(s). For example, the function group detail panel 440 may include values for the peak utilization and/or nth percentile utilization for processor, memory, and/or network utilization. In other examples, the function group panel 440 may include values for ratio(s) of peak and nth percentile utilization, such as the Network Traffic coefficient 13 described in reference to Table 1.

In the example, shown in FIG. 4, the options 416, 418, 420 allow for manipulation of selected subsets of the computing resources. For example, as shown the example routine in table two, the sizing adjustments may be "binned" into consumption savings classes. For example, "high", "medium", and "low" consumption savings bins may allow the operator to select specific groups of sizing adjustments. The options 416, 418, 420 show the respective portions of the total consumption savings that may be achieved by adjusting each specific subset of the computing resources. In the example, the first subset option 416 provides the greatest marginal consumption savings, while the options 418, 420 provide successively smaller marginal consumption savings.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect may include a system including network interface circuitry configured to: receive historical utilization data 112 and tagging data for a selected virtual machine; receive computer resource configurations; send a compute sizing correction (CSC) token to a host interface. The host interface may be configured to control requisition for at least the selected virtual machine. The system may include sizing circuitry in data communication with the network interface circuitry, the sizing circuitry configured to execute a CSC stack.

The CSC stack may include: a data staging layer; an input layer; a configuration layer; and a prescriptive engine layer. The CSC stack may be executable to obtain, via the input layer, the historical utilization data 112; process, at the input layer, the historical utilization data 112 to generate cleansed utilization data, the cleansed utilization data comprising a network utilization metric, a memory utilization metric, and a processor utilization metric. The CSC stack may be further executable to store, at the data staging layer, the cleansed utilization data and the tagging data of the selected virtual machine; determine, at the configuration layer, a compute utilization sizing criterion comprising logic to determine to a CSC trajectory based on the network utilization metric, the memory utilization metric, and the processor utilization metric; determine, at the configuration layer, a resource transition criteria; store, at the data staging layer, the compute utilization sizing criterion and the resource transition criteria; access, at the prescriptive engine layer, the cleansed utilization data, and the tagging data of the selected virtual machine and the resource transition criteria via a memory resource provided by the data staging layer.

Based on the network utilization metric 121, the memory utilization metric 120, the processor utilization metric 119 and the compute utilization sizing criterion, The CSC stack may be further executable to determine, at the prescriptive engine layer, a CSC trajectory for the selected virtual machine.

Based on the tagging data of the selected virtual machine and the resource transition criteria, The CSC stack may be further executable to select, at the prescriptive engine layer, a resource configuration from the resource configurations.

Based on the CSC trajectory and the selected resource configuration, the CSC stack may be further executable to determine a CSC adjustment for the selected virtual machine; and based on the CSC adjustment, generate the CSC token.

A second aspect any of the previous aspects and the CSC stack may be further executable to determine, based on the processor utilization metric, processor utilization measurements comprising a peak processor utilization measurement over a time period and a percentile-based processor utilization measurement over the time period. The CSC stack may be further executable to determine, based on the memory utilization metric, memory utilization measurements comprising a peak memory utilization measurement over the time period and percentile based utilization measurement over the time period. The CSC stack may be further executable to determine, based on the network utilization metric, network utilization measurements comprising a peak network traffic measurement and a percent-based network traffic measurement. The CSC stack may be further executable to generate the CSC trajectory in response to satisfaction of a first condition, satisfaction of a second condition, and satisfaction of a third condition, the first condition is based on at least one of the processor utilization measurements, the second condition is based on at least one of the memory utilization measurements, and the third condition is based on at least one of the network utilization measurements.

A third aspect may include any of the previous aspects. Satisfaction of the first condition may include the peak processor utilization measurement being less than a threshold processor utilization value or the percentile-based processor utilization measurement being less than a percentile based processor threshold value. Satisfaction of the second condition may include the peak memory utilization measurement being less than a threshold memory utilization value or the percentile-based memory utilization measurement being less than a percentile-based memory threshold value. Satisfaction of the third condition may include a network traffic ratio being less than a network traffic utilization threshold, wherein the network traffic ratio may include a ratio of the peak network traffic measurement and the percentile based traffic measurement.

A fourth aspect may include any of the previous aspects, wherein the CSC stack is further configured to determine, based on the resource transition criteria, the tagging data of the selected virtual machine is compatible with the resource configuration, wherein the resource configuration is selected in response to determination that the tagging data of the selected virtual machine is compatible with the resource configuration.

A fifth aspect may include the previous aspect, where to determine, based on the resource transition criteria, the tagging data of the selected virtual machine is compatible with the at least one of the resource configurations. The CSC stack may be further executable to identify, from the resource configurations, the resource configuration in response to predetermined tagging data of the resource configuration matching the tagging data of the selected virtual machine.

A sixth aspect may include any of the previous aspects, wherein the CSC token, when sent to the host interface, causes the host interface to implement the CSC adjustment by re-provisioning the selected virtual machine based on the selected resource configuration.

A seventh aspect may include any of the previous aspects, wherein the CSC stack is further executable to determine the CSC token based on a feedback history generated using previous command inputs received from a CSC control interface generated at a presentation layer of the CSC stack.

An eight aspect may include any of the previous aspects, wherein the CSC stack is further executable to, at a presentation layer, generate CSC control interface including a CSC-window presentation, wherein the CSC-window presentation includes a selectable option to implement the CSC adjustment.

A ninth aspect may include the eighth aspect, wherein the CSC adjustment is grouped within the CSC-window presentation with other CSC adjustments corresponding to consumption savings within a pre-defined range.

A tenth aspect may include the eighth aspect, wherein the CSC-window presentation includes a summary table detailing CSC adjustments for multiple virtual machines.

An eleventh aspect may include any previous aspect, wherein the CSC stack is executable to receive supplemental tagging data for at least one of the computer resource configurations, enrich the computer resource configurations with the supplemental tagging data, and rank the computer resource configurations based on the supplemental tagging data. To select to resource configuration from the resource configurations, CSC stack may be further executable to select the resource configuration in response to the resource configuration being highest ranked among the resource configurations.

A twelfth aspect may include any of the previous aspects, wherein the CSC token is configured to alter a compute capability for the selected virtual machine while preserving a selected operating system, region, networking throughput, or any combination thereof for the selected virtual machine.

What is claimed is:

1. A system including:
    network interface circuitry configured to:
        receive historical utilization data and tagging data for a selected virtual machine;
        receive computer resource configurations;
        send a compute sizing correction (CSC) token to a host interface, the host interface configured to control requisition for the selected virtual machine;
    sizing circuitry in data communication with the network interface circuitry, the sizing circuitry configured to execute a CSC stack,
        the CSC stack including:
            a data staging layer;
            an input layer;
            a configuration layer; and
            a prescriptive engine layer;
        the CSC stack executable to:
            obtain, via the input layer, the historical utilization data;
            process, at the input layer, the historical utilization data to generate cleansed utilization data, the cleansed utilization data comprising a network utilization metric, a memory utilization metric, and a processor utilization metric;
            store, at the data staging layer, the cleansed utilization data and the tagging data of the selected virtual machine;
            determine, at the configuration layer, a compute utilization sizing criterion comprising logic to generate to a CSC trajectory based on the network utilization metric, the memory utilization metric, and the processor utilization metric;
            determine, at the configuration layer, a resource transition criteria;
            store, at the data staging layer, the compute utilization sizing criterion and the resource transition criteria;
            access, at the prescriptive engine layer, the cleansed utilization data, and the tagging data of the selected virtual machine and the resource transition criteria via a memory resource provided by the data staging layer;
            based on the network utilization metric, the memory utilization metric, the processor utilization metric and the compute utilization sizing criterion, generate, at the prescriptive engine layer, the CSC trajectory for the selected virtual machine in response to satisfaction of a first condition, satisfaction of a second condition, and satisfaction of a third condition, the first condition being based on a processor utilization measurement, the second condition being based on a memory utilization measurement, and the third condition being based on a network utilization measurement;
            based on the tagging data of the selected virtual machine and the resource transition criteria, select, at the prescriptive engine layer, a resource configuration from the resource configurations;
            based on the CSC trajectory and the selected resource configuration, determine a CSC adjustment for the selected virtual machine; and
            based on the CSC adjustment, generate the CSC token.

2. The system of claim 1, wherein the CSC stack is configured to:
    determine, based on the processor utilization metric, the processor utilization measurement, the processor utilization measurement comprising a peak processor utilization measurement over a time period, a percentile-based processor utilization measurement over the time period, or a combination thereof;
    determine, based on the memory utilization metric, memory utilization measurement, the memory utilization measurement comprising a peak memory utilization measurement over the time period, percentile based utilization measurement over the time period, or a combination thereof; and
    determine, based on the network utilization metric, the network utilization measurement, the network utilization measurement comprising a peak network traffic measurement, a percent-based network traffic measurement, or a combination thereof.

3. The system of claim 2,
    wherein satisfaction of the first condition comprises the peak processor utilization measurement being greater than a threshold processor utilization value and the percentile-based processor utilization measurement being less than a percentile based processor threshold value, wherein satisfaction of the second condition comprises the peak memory utilization measurement being greater than a threshold memory utilization value and the percentile-based memory utilization measurement being less than a percentile-based memory threshold value, and wherein satisfaction of the third condition comprises a network traffic ratio being greater than a network traffic utilization threshold, wherein the network traffic ratio comprises a ratio of the peak network traffic measurement and the percentile based traffic measurement.

4. The system of claim 1, wherein the CSC stack is further configured to:

determine, based on the resource transition criteria, the tagging data of the selected virtual machine is compatible with the resource configuration, wherein the resource configuration is selected in response to determination that the tagging data of the selected virtual machine is compatible with the resource configuration.

5. The system of claim 4, wherein to determine, based on the resource transition criteria, the tagging data of the selected virtual machine is compatible with the at least one of the resource configurations, the CSC stack is further configured to:

identify, from the resource configurations, the resource configuration in response to predetermined tagging data of the resource configuration matching the tagging data of the selected virtual machine.

6. The system of claim 1, wherein the CSC token, when sent to the host interface, causes the host interface to implement the CSC adjustment by re-provisioning the selected virtual machine based on the selected resource configuration.

7. The system of claim 1, wherein the CSC stack is further executable to determine the CSC token based on a feedback history generated using previous command inputs received from a CSC control interface generated at a presentation layer of the CSC stack.

8. The system of claim 1, wherein the CSC stack is further executable to, at a presentation layer, generate CSC control interface including a CSC-window presentation, wherein the CSC-window presentation includes a selectable option to implement the CSC adjustment.

9. The system of claim 8, wherein the CSC adjustment is grouped within the CSC-window presentation with other CSC adjustments corresponding to consumption savings within a pre-defined range.

10. The system of claim 8, wherein the CSC-window presentation includes a summary table detailing CSC adjustments for multiple virtual machines.

11. The system of claim 1, further the CSC stack executable to:

receive supplemental tagging data for at least one of the computer resource configurations;

enrich the computer resource configurations with the supplemental tagging data; and rank the computer resource configurations based on the supplemental tagging data, wherein to select to resource configuration from the resource configurations, CSC stack is further executable to:

select the resource configuration in response to the resource configuration being highest ranked among the resource configurations.

12. The system of claim 1, wherein the CSC token is configured to alter a compute capability for the selected virtual machine while preserving a selected operating system, region, networking throughput, or any combination thereof for the selected virtual machine.

13. A method including:

at network interface circuitry:
receiving historical utilization data for a selected virtual machine;
receiving tagging data for the selected virtual machine; and
receiving computer resource configuration data;

at sizing circuitry in data communication with the network interface circuitry, the sizing circuitry executing a compute sizing correction (CSC) stack:

obtaining, via an input layer of the CSC stack, the historical utilization data;

processing, at the input layer, the historical utilization data to generate cleansed utilization data, the cleansed utilization data comprising a network utilization metric, a memory utilization metric, and a processor utilization metric;

storing, at a data staging layer of the CSC stack, the cleansed utilization data and the tagging data of the selected virtual machine;

determining, at a configuration layer of the CSC stack, a compute utilization sizing criterion comprising logic to determine to a CSC trajectory based on the network utilization metric, the memory utilization metric, and the processor utilization metric; and determining, at the configuration layer, a resource transition criteria;

storing, at the data staging layer, the compute utilization sizing criterion and the resource transition criteria;

at a prescriptive engine layer of the CSC stack:

accessing the cleansed utilization data and the compute utilization sizing criterion via a memory resource provided by the data staging layer;

based on the network utilization metric, the memory utilization metric, the processor utilization metric and the compute utilization sizing criterion, determining the CSC trajectory for the selected virtual machine in response to satisfaction of a first condition, satisfaction of a second condition, and satisfaction of a third condition, the first condition being based on a processor utilization measurement, the second condition being based on a memory utilization measurement, and the third condition being based on a network utilization measurement;

accessing the tagged data of the selected virtual machine and the resource transition criteria;

based on the tagging data of the selected virtual machine and the resource transition criteria, select, at the prescriptive engine layer, a resource configuration from the resource configurations;

based on to the CSC trajectory and the selected resource configurations, determining a CSC adjustment for the selected virtual machine; and based on the CSC adjustment, generating a CSC token; and sending, via network interface circuitry, the CSC token to a host interface configured to control requisition for at least the selected virtual machine.

14. The method of claim 13, wherein the CSC token causes the host interface to implement the CSC adjustment by re-provisioning the selected virtual machine based on the selected resource configuration.

15. The method of claim 13, wherein determining the CSC token is further based on a feedback history generated using previous command inputs from a CSC control interface generated at a presentation layer of the CSC stack.

16. The method of claim 13, wherein the method further includes generating, at a presentation layer of the CSC stack, a CSC-window presentation within a CSC control interface, and wherein the CSC-window presentation includes a selectable option to implement the CSC adjustment.

17. A product including:
 machine-readable media other than a transitory signal; and
 instructions stored on the machine-readable media, the instructions configured to, when executed, cause a machine to:
  at network interface circuitry:
   receive historical utilization data for a selected virtual machine;
   receive tagging data for the selected virtual machine; and
   receive resource configurations;
  at sizing circuitry in data communication with the network interface circuitry, the sizing executing a compute sizing correction (CSC) stack:
   obtain, via an input layer of the CSC stack, the historical utilization data;
   process, at the input layer, the historical utilization data to generate cleansed utilization data, the cleansed utilization data comprising a network utilization metric, a memory utilization metric, and a processor utilization metric;
   store, at a data staging layer of the CSC stack, the cleansed utilization data, and the consumption metric data;
   determine, at a configuration layer of the CSC stack, a compute utilization sizing criterion; and
   store, at the data staging layer, the compute utilization sizing criterion and the tagging data of the selected virtual machine;
  at a prescriptive engine layer of the CSC stack:
   access the cleansed utilization data and the compute utilization sizing criterion via a memory resource provided by the data staging layer;
   based on the network utilization metric, the memory utilization metric, the processor utilization metric and the compute utilization sizing criterion, determine a CSC trajectory for the selected virtual machine in response to satisfaction of a first condition, satisfaction of a second condition, and satisfaction of a third condition, the first condition being based on a processor utilization measurement, the second condition being based on a memory utilization measurement, and the third condition being based on a network utilization measurement;
   accessing the tagged data of the selected virtual machine and the resource transition criteria;
   based on the tagging data of the resource configurations and the resource transition criteria, select, at the prescriptive engine layer, a resource configuration from the resource configurations;
   based on to the CSC trajectory and the selected resource configuration, determine a CSC adjustment for the selected virtual machine; and
   based on the CSC adjustment, generate a CSC token; and
  send, via network interface circuitry, the CSC token to a host interface configured to control requisition for at least the selected virtual machine to cause the host interface to implement the CSC adjustment.

18. The product of claim 17, wherein the instructions are further configured to:
 determine, based on the processor utilization metric, the processor utilization measurement, the processor utilization measurement comprising a peak processor utilization measurement over a time period, a percentile-based processor utilization measurement over the time period, or any combination thereof;
 determine, based on the memory utilization metric, the memory utilization measurement, the memory utilization measurement comprising a peak memory utilization measurement over the time period, percentile based utilization measurement over the time period, or any combination thereof; and
 determine, based on the network utilization metric, the network utilization measurement, the network utilization measurement comprising a peak network traffic measurement, a percent-based network traffic measurement, or any combination thereof; and
 generate the CSC trajectory based on a comparison of the processor utilization measurement, the memory utilization measurement, and the network utilization measurement with predefined thresholds included in the compute utilization sizing criteria.

19. The product of claim 17, wherein the instructions are further configured to:
 determine, based on the resource transition criteria, that the tagging data of the selected virtual machine is compatible with the resource configuration from resource configurations.

20. The product of claim 19, wherein the resource configuration comprises predetermined tagging data, wherein to determine, based on the resource transition criteria, that the tagging data of the selected virtual machine is compatible with the resource configuration, the instructions are further configured to:
 identify, from the resource configurations, the resource configuration in response to predetermined tagging data of the resource configuration matching the tagging data of the selected virtual machine.

\* \* \* \* \*